(12) United States Patent
Lim

(10) Patent No.: US 7,993,047 B2
(45) Date of Patent: Aug. 9, 2011

(54) DIRECT TYPE BACKLIGHT UNIT

(75) Inventor: Dae San Lim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/168,536

(22) Filed: Jun. 29, 2005

(65) Prior Publication Data

US 2006/0120102 A1     Jun. 8, 2006

(30) Foreign Application Priority Data

Dec. 8, 2004   (KR) .................. 10-2004-0102901

(51) Int. Cl.
    *F21V 7/04*     (2006.01)
(52) U.S. Cl. ........................ 362/614; 362/97.1
(58) Field of Classification Search .......... 362/614, 362/216, 97, 260; 349/70; 313/318.01, 318.02, 313/488, 489
    See application file for complete search history.

(56) References Cited

U.S. PATENT DOCUMENTS

| | | | | |
|---|---|---|---|---|
| 4,625,152 A | * | 11/1986 | Nakai | 315/317 |
| 4,992,916 A | | 2/1991 | Henkes | |
| 5,003,220 A | * | 3/1991 | Fohl et al. | 313/488 |
| 5,089,943 A | | 2/1992 | Wolfelschneider | |
| 5,138,223 A | * | 8/1992 | Osada et al. | 313/488 |
| 5,619,351 A | * | 4/1997 | Funamoto et al. | 349/61 |
| 6,149,285 A | * | 11/2000 | Cicarelli | 362/255 |
| 6,722,773 B2 | | 4/2004 | Tsai et al. | |
| 6,828,720 B2 | * | 12/2004 | Cavallaro et al. | 313/489 |
| 7,086,753 B2 | * | 8/2006 | Lin et al. | 362/225 |
| 2002/0021564 A1 | | 2/2002 | Cho et al. | |
| 2003/0142487 A1 | * | 7/2003 | Fan | 362/29 |
| 2004/0223319 A1 | * | 11/2004 | Chou et al. | 362/97 |
| 2004/0232854 A1 | | 11/2004 | Chou | |
| 2004/0257793 A1 | | 12/2004 | Wakabayashi | |
| 2005/0094389 A1 | * | 5/2005 | Peng et al. | 362/218 |
| 2005/0127839 A1 | * | 6/2005 | Choi | 313/607 |
| 2005/0194884 A1 | * | 9/2005 | Liu | 313/483 |
| 2006/0002106 A1 | * | 1/2006 | Hong et al. | 362/224 |

FOREIGN PATENT DOCUMENTS

JP     2004-342335 A     12/2004

* cited by examiner

*Primary Examiner* — Julie A Shallenberger
(74) *Attorney, Agent, or Firm* — Birch, Stewart, Kolasch & Birch, LLP

(57) ABSTRACT

A backlight unit is disclosed which improves picture quality by preventing a bright line or a dark line from being visible in the center of the display area. The backlight unit includes a plurality of U-shaped lamps arranged in two columns, wherein curved portions of the two opposite U-shaped lamps are symmetrically positioned in the center of a display area. Each of the curved portions of the U-shaped lamps has a non-luminous part so that light is not emitted by the curved portions of the U-shaped lamps. Optical sheets are provided above the U-shaped lamps, and a reflective sheet is provided below the U-shaped lamps.

6 Claims, 5 Drawing Sheets

DIRECT TYPE BACKLIGHT UNIT

This application claims priority under 35 U.S.C. §119(a) on Patent Application No. P2004-102901 filed in Korea on Dec. 8, 2004, the entire contents of which are hereby incorporated by reference.

BACKGROUND OF THE INVENTION

1. Field of the Invention

The present invention relates to a backlight unit of a liquid crystal display (LCD) device, and more particularly, to a direct type backlight unit having U-shaped lamps and which obtains light uniformity by preventing a dark line from being generated in the center of an LCD panel of the LCD device.

2. Discussion of the Related Art

Recently, various display devices have been actively researched and studied, for example, a liquid crystal display (LCD) device, a field emission display (FED) device, an electro-luminescence display (ELD) device, and a plasma display panel (PDP). Among these display devices, the LCD device has been most widely used because of the advantageous characteristics of thin profile, lightness in weight, and low power consumption. The LCD device is continuously in demand for use in notebook computers, desktop monitors and liquid crystal televisions.

Because the LCD device does not itself generate light, the LCD device requires an additional light source. In the case of a transmitting type LCD device, it is necessary to provide an additional light source such as a backlight unit, which emits the light toward the rear of an LCD panel. The backlight unit is classified into a direct type backlight and an edge type backlight, according to the arrangement of light-emitting lamps.

In the edge type backlight unit, a linear light-emitting lamp (cold cathode fluorescent lamp or hot cathode fluorescent lamp) having a tubular shape is provided at one side of an LCD panel. A transparent light-guiding plate is also provided to guide the light emitted from the light-emitting lamp to the entire surface of the LCD panel.

In the case of the direct type backlight unit, a light-emitting lamp is selectively provided below an LCD panel, whereby the light emitted from the light-emitting lamp is uniformly diffused to the entire LCD panel by light-diffusion sheets provided between the light-emitting lamp and the LCD panel. The direct type backlight unit is advantageous in that it permit the device to have a lightweight thin profile with high luminance and uniform light distribution.

A direct type backlight unit according to the related art will now be described with reference to the accompanying drawings. First, an LCD device having a direct type backlight unit according to the related art will be described. The LCD device includes an LCD panel, polarizing sheets, a direct type backlight unit, a case, and a bezel unit. The LCD panel is comprised of lower and upper substrates being bonded to each other, and a liquid crystal layer formed between the lower and upper substrates. The polarizing sheets are adhered to the lower and upper surfaces of the LCD panel, to transmit only light of a predetermined orientation. The direct type backlight unit is provided at a predetermined interval from the LCD panel to provide the light to the LCD panel. The case covers the external surface of the backlight unit, to support and fix the LCD panel and the direct type backlight unit. The bezel unit, made of stainless steel, is adhered to the external of the case. The bezel unit covers the circumference of the LCD panel except for an effective area for displaying the image.

As shown in FIG. 1, the direct type backlight unit includes a plurality of straight light-emitting lamps 111, an outer case 103, and optical sheets including a light-diffusion sheet 115, a prism sheet 116 and a protection sheet 117. The light-emitting lamps 111 are formed of cold cathode fluorescent lamps CCFL, with both ends thereof inserted into holes formed at both sides of the outer case 103. The optical sheets including the light-diffusion sheet 115, the prism sheet 116 and the protection sheet 117 are positioned between the light-emitting lamps 111 and an LCD panel (not shown).

The optical sheets minimize the silhouette of the light-emitting lamps 111 from being shown on a display surface of the LCD panel (not shown), and provide a light source with uniform luminance. In addition, a reflective sheet 114 is provided below the light-emitting lamps 111 for concentrating the light emitted from the light-emitting lamps 111 to the display part of the LCD panel, thereby improving the light efficiency.

However, the backlight unit of the linear shape reaches the limit on the division drive of the LCD device. To perform the division drive of the LCD device, in a state of dividing the display area into a plurality of parts, the quantity of light of the backlight unit increases in the part of the bright image, and the quantity of light of the backlight unit decreases in the part of the dark image. In this case, a light-emitting lamp 211 is formed in a U-shape, as shown in FIG. 2.

FIG. 2 is a schematic view showing a display area divided into eight parts. To form the U-shaped light-emitting lamp 211, as shown in FIG. 2 and FIG. 3, a fluorescent substance 205 is coated on an inner surface of a U-shaped glass tube, and then a mixed inert gas or a discharge gas such as hydrargyrum Hg is injected into the U-shaped glass tube. After that, both ends of the U-shaped glass tube are sealed. In this state, electrodes 208 are formed at both ends of the glass tube. Also, power supplying wires 209 are respectively connected with both electrodes 208 of the glass tube, to supply the power to the light-emitting lamp 211. The power supplying wires 209 are connected with an inverter 206 by a connector 207.

At this time, the U-shaped light-emitting lamps 211 are symmetrically arranged such that the curved part of each of the light-emitting lamps is positioned in correspondence with the center of the display area. In this case, the quantity of light in the center of the display area varies according to the distance between the curved parts of the opposite U-shaped light-emitting lamps.

If there is a large distance between the curved parts of the opposite U-shaped emitting lamps, a dark line (A) is generated in the center of the display area. Conversely, if there is a small distance between the curved parts of the opposite U-shaped light-emitting lamps, a bright line is generated in the center of the display area.

On the division drive of the U-shaped light-emitting lamps in the symmetric arrangement of the light-emitting lamps, a dark line or a bright line may be generated in the center of the display area, thereby deteriorating the picture quality.

SUMMARY OF THE INVENTION

Accordingly, the present invention is directed to a backlight unit that substantially obviates one or more problems due to limitations and disadvantages of the related art.

An object of the present invention is to provide a backlight unit, in which a plurality of U-shaped light-emitting lamps are symmetrically arranged in two columns such that the curved portions of the opposite U-shaped light-emitting lamps are maintained at a minimum interval, and the curved portions have no fluorescent substance coated thereon, to thereby improve the picture quality by preventing a bright line or a dark line from being produced in the center of the display area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a direct type backlight unit includes a plurality of U-shaped lamps arranged in two columns, wherein curved portions of the two opposite U-shaped lamps are symmetrically positioned in the center of a display area, and each of the curved portions of the U-shaped lamps has a non-luminous part. Optical sheets are provided above the U-shaped lamps, and a reflective sheet is provided below the U-shaped lamps. A case is provided for receiving and fixing the aforementioned elements.

The curved portions of the opposite U-shaped lamps are symmetrically maintained at a minimum spacing interval. In one embodiment, the curved portions of the opposite U-shaped lamps are symmetrically maintained with a spacing interval of about 1 mm.

A fluorescent substance is not coated on the non-luminous part in the curved portion of the U-shaped lamp. In one embodiment, the width of the non-luminous part is about 5 mm, and the diameter of the U-shaped lamp is about 3 to 4 mm. The optical sheets are formed of a light-diffusion sheet, a prism sheet and a protection sheet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
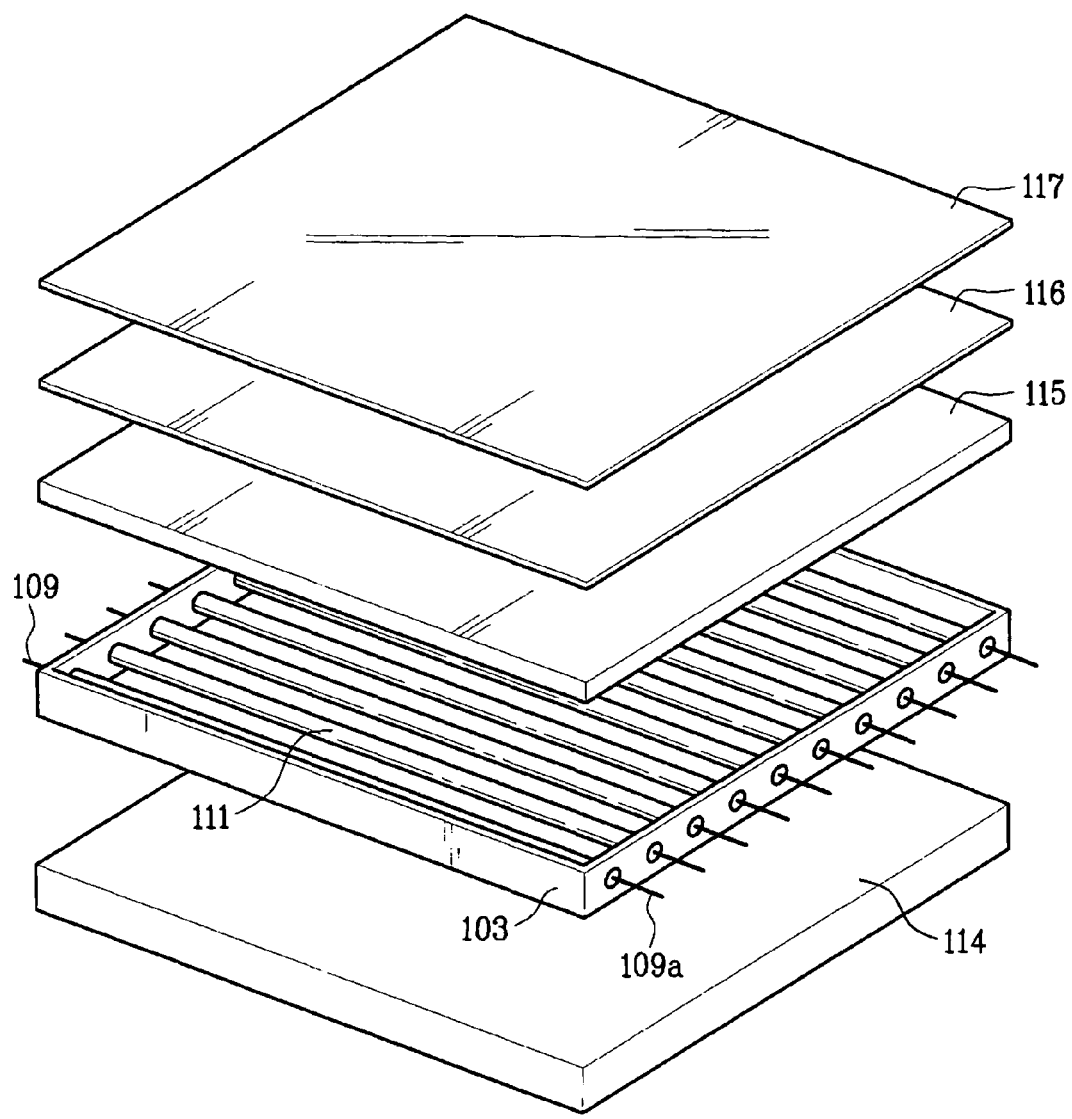
FIG. 1 is a perspective view showing a direct type backlight unit according to one type of related art.
Figure 2:
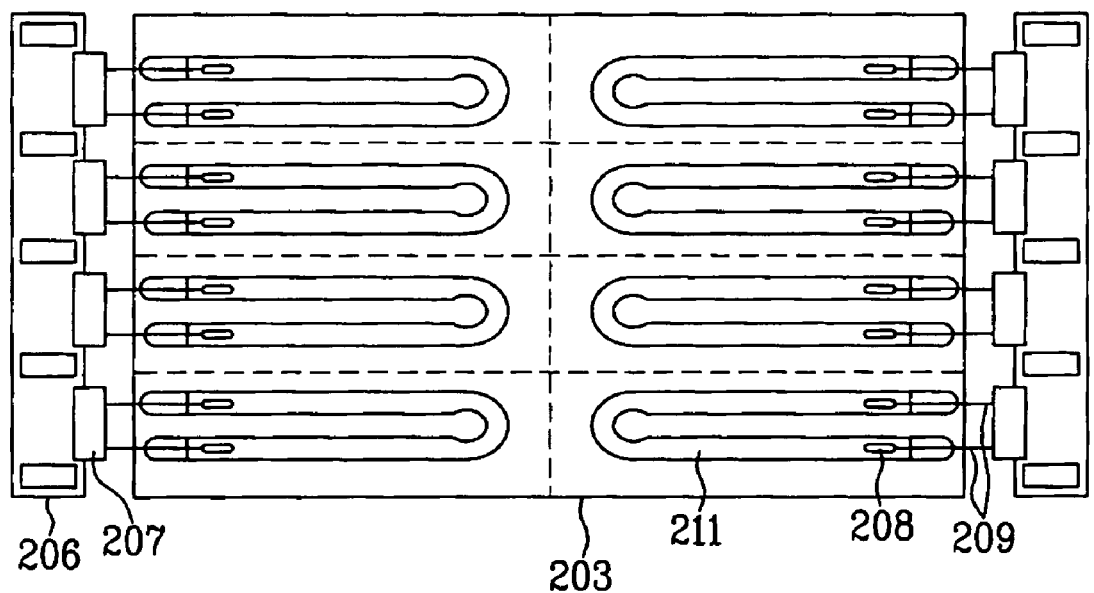
FIG. 2 is a plan view showing a direct type backlight unit according to another type of related art.
Figure 3:
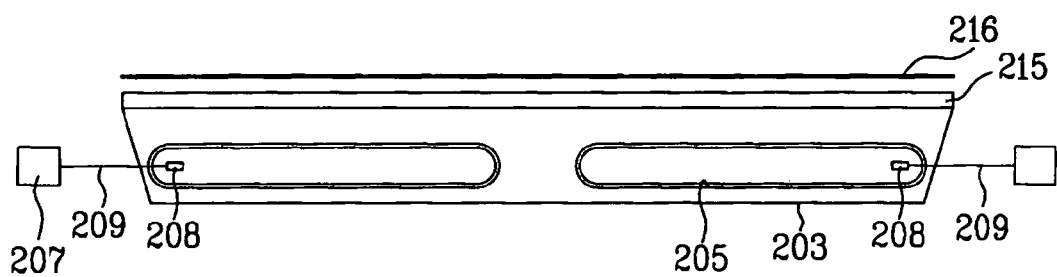
FIG. 3 is a cross sectional view of the direct type backlight unit of FIG. 2.
Figure 4:
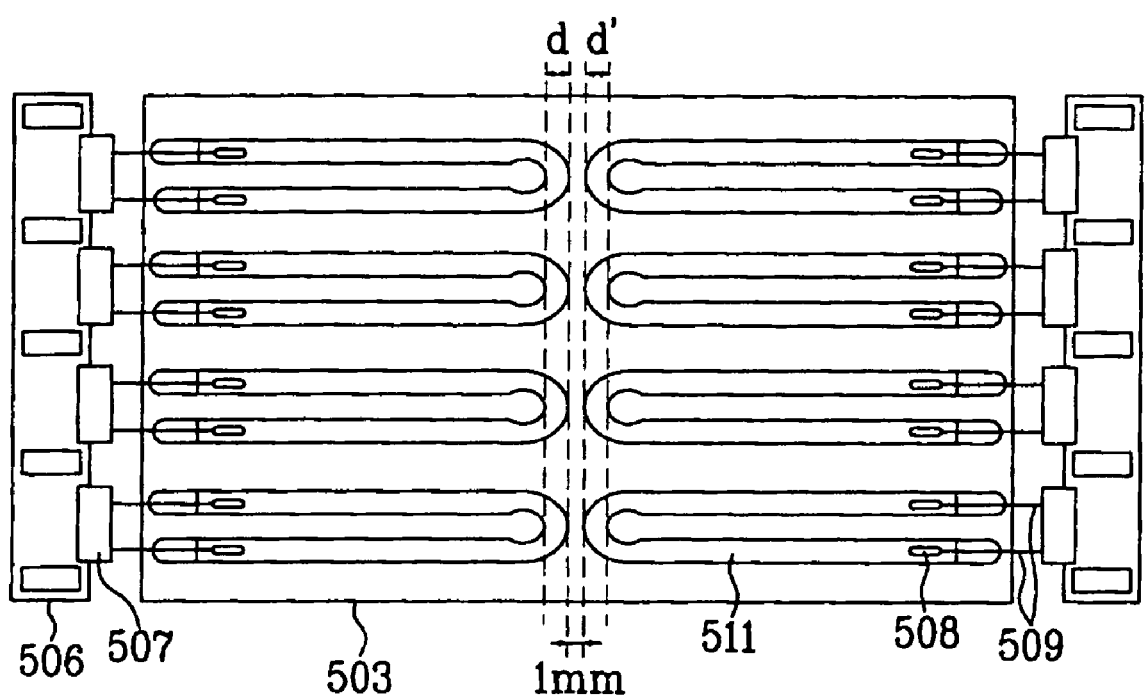
FIG. 4 is a plan view showing a direct type backlight unit according to the preferred embodiment of the present invention.
Figure 5:
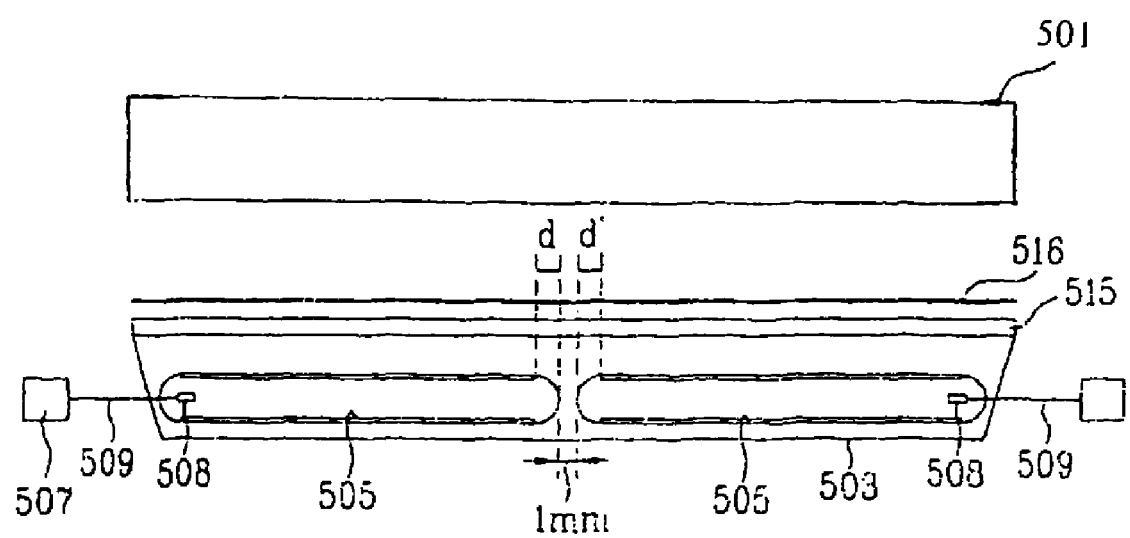
FIG. 5 is a cross sectional view of the direct type backlight unit of FIG. 4.

Hereinafter, a backlight unit according to the preferred embodiment of the present invention will be described with reference to the accompanying drawings. As shown in FIG. 4 and FIG. 5, a direct type backlight unit according to the preferred embodiment of the present invention includes a plurality of U-shaped light-emitting lamps 511, a reflective sheet (not shown), a light-diffusion sheet 515, and a prism sheet 516. In each of the plurality of U-shaped light-emitting lamps 511, the curved portion is formed of a non-luminous part. The plurality of U-shaped light-emitting lamps 511 are symmetrically arranged in two columns so that the curved portions of the opposite U-shaped light-emitting lamps 511 are maintained at a minimum spacing interval. The reflective sheet (not shown) is provided below the light-emitting lamps 511, to reflect the light upward. The light-diffusion sheet 515 is positioned above the light-emitting lamps 511, to uniformly diffuse the light emitted from the light-emitting lamps 511. The prism sheet 516 is provided above the light-diffusion sheet 515, to concentrate and guide the diffused light up toward an LCD panel 501.

In addition, a protection sheet may be provided above the prism sheet 516, to protect the prism sheet 516. Generally, the light-diffusion sheet 515, the prism sheet 516 and the protection sheet are referred to as optical sheets, which minimize the silhouette of the light-emitting lamps 511 from being shown on a display surface of the LCD panel, and which provide a light source with uniform luminance. In this case, the plurality of optical sheets may be provided to improve the light-scattering effect. The aforementioned elements are received in and fixed to a case 503. The direct type backlight unit according to the present invention is positioned below the LCD panel 501, thereby providing a flat type light source of uniform luminance to the LCD panel.

In the direct type backlight unit according to the present invention, the curved portions of the two opposite U-shaped light-emitting lamps are maintained at a minimum spacing interval, preferably about 1 mm. At this time, the curved portion of each of the light-emitting lamps 511 has the non-luminous part. Stated differently, the curved portion of each of the light-emitting lamps 511 does not have a luminous part When coating a fluorescent substance 505 on the inner surface of the light-emitting lamp, the fluorescent substance 505 is not coated on the curved portion of the light-emitting lamp 511, so that the non-luminous part is formed in the curved portion of the light-emitting lamp 511. Alternatively, if a fluorescent substance 505 is coated on the interior surface of the curved portion of the light-emitting lamp 511, then the exterior surface of the curved portion is coated with a light blocking coating so that the non-luminous part is formed in the curved portion of the light-emitting lamp 511.

The U-shaped light-emitting lamp 511 is comprised of a U-shaped glass tube, positive and negative electrodes 508, power supplying wires 509, and the fluorescent substance 505. The positive and negative electrodes 508 are respectively formed at both ends of the U-shaped glass tube. The power supplying wires 509 are soldered to the electrodes 508, to apply a voltage thereto. Also, the fluorescent substance 505 is coated on the luminous part of interior surface of the U-shaped glass tube.

After coating the fluorescent substance 505 on the inner surface of the U-shaped glass tube, the U-shaped glass tube is filled with a discharge gas, for example, neon Ne, argon Ar and hydrargyrum Hg. Then, both ends of the U-shaped glass tube are sealed. Also, the power supplying wires 509 are connected with an inverter 506 by a connector 507.

In one embodiment, the fluorescent substance 505 is not coated on the curved portion of the U-shaped light-emitting lamp 511. The non-luminous part of the U-shaped light-emitting lamp 511, on which the fluorescent substance is not coated, corresponds to the central portion of the display area. For example, the width (d, d') of the non-luminous part is about 5 mm. In this case, the diameter of the U-shaped light-emitting lamp 511 corresponds to about 3 to 4 mm. Accordingly, the width of the non-luminous part may vary according to the diameter of the U-shaped light-emitting lamp 511.

The principle of light emission in the U-shaped light-emitting lamp 511 will now be described. As voltage is applied to the two electrodes 508 formed at both ends of the transparent glass tube, electrons collide against the electrodes 508. As a result, the discharge is started with secondary electrons being emitted. The electrons, flowing by the discharge, collide against other electrons, for example, hydrargyrum Hg, whereby ultraviolet rays are generated. The ultraviolet rays excite the fluorescent substance within the U-shaped light emitting lamp 511, so that visible rays are generated. In the present invention, the visible rays are not generated in the curved portion of the U-shaped light-emitting lamp 511, on which the fluorescent substance is not coated, so that the curved portion of the U-shaped light-emitting lamp 511 serves as the non-luminous part.

In the aforementioned backlight unit according to the present invention, the two opposite U-shaped light-emitting lamps 511 are arranged symmetrically with respect to the curved portions of the U-shaped light-emitting lamps 511. Also, the curved portions of the two opposite U-shaped light-emitting lamps 511 are maintained at the minimum interval, and the fluorescent substance is not coated on the curved portion of each of the U-shaped light-emitting lamps 511. Accordingly, it is possible to prevent a dark line or a bright line from being generated in the curved portions of the U-shaped light-emitting lamps 511, thereby obtaining uniform luminance of the display.

By providing the two opposite U-shaped light-emitting lamps 511 in the symmetric arrangement with respect to the curved portions thereof, it is also possible to form the non-luminous part in the curved portion of any one of the two U-shaped light-emitting lamps 511.

As mentioned above, the direct type backlight unit according to the present invention has several advantages. In the direct type backlight unit according to the present invention, the plurality of U-shaped light-emitting lamps 511 are symmetrically arranged in two columns such that the curved portions of the opposite U-shaped light-emitting lamps 511 are maintained at a minimum spacing interval, and the non-luminous part is formed in the curved portion of each of the U-shaped light-emitting lamps 511. Accordingly, it is possible to prevent a dark line or a bright line from being generated in the area of the display above the curved portions of the U-shaped light-emitting lamps 511, thereby obtaining uniform luminance and improving the picture quality.

It will be apparent to those skilled in the art that various modifications and variations can be made in the present invention. Thus, it is intended that the present invention covers the modifications and variations of this invention provided they come within the scope of the appended claims and their equivalents.

What is claimed is:
1. A direct type backlight unit comprising:
a plurality of U-shaped lamps arranged in two columns, wherein curved portions of two opposite U-shaped lamps are symmetrically positioned in the center of a display area, and the curved portion of any one of the two U-shaped lamps has a non-luminous portion, so as to provide a uniform luminance across the plurality of U-shaped lamps,
wherein a fluorescent substance is not coated on the non-luminous portion in the curved portion of the U-shaped lamp,
wherein a spacing interval between the curved portions of the opposite U-shaped lamps is smaller than a width of the non-luminous portion,
wherein a diameter of each of the U-shaped lamps is to 4 mm,
wherein optical sheets are provided above the U-shaped lamps,
wherein the optical sheets are formed of a light-diffusion sheet, a prism sheet and a protection sheet,
wherein a reflective sheet is provided below the U-shaped lamps, and
wherein a case is provided for receiving and fixing the U-shaped lamps, the optical sheets, and the reflective sheet;
wherein a width of the non-luminous portion is 5 mm; and
wherein the curved portions of the opposite U-shaped lamps are symmetrically maintained at a spacing interval of 1 mm.

2. A backlight unit, comprising:
a first U-shaped lamp having a first straight section, a second straight section, and a curved section intermediate the first straight section and the second straight section such that the first straight section is located beside and generally parallel to the second straight section,
a second U-shaped lamp having a first straight segment, a second straight segment, and a curved segment intermediate the first straight segment and the second straight segment such that the first straight segment is located beside and generally parallel to the second straight segment,
wherein the curved section of the first U-shaped lamp and the curved segment of the second U-shaped lamp are positioned adjacent to one another with a spacing interval of 1 mm therebetween,
wherein the curved section of the first U-shaped lamp comprises a non-luminous portion,
wherein a fluorescent substance is provided on an interior surface of the first straight section and the second straight section, and a fluorescent substance is not provided on an interior surface of the portion of the curved section that comprises the non-luminous portion,
wherein the first and second U-shaped lamps are symmetrically arranged with the curved sections of the first and second U-shaped lamps facing each other, so as to provide a uniform luminance across the first and second U-shaped lamps,
wherein a spacing interval between the curved sections of the opposite U-shaped lamps is smaller than a width of the non-luminous portion,
wherein each diameter of the first and second U-shaped lamps is 3 to 4 mm,
wherein optical sheets are provided above the first and second U-shaped lamps,
wherein the optical sheets are formed of a light-diffusion sheet, a prism sheet and a protection sheet,
wherein a reflective sheet is provided below the first and second U-shaped lamps,
wherein a case is provided for receiving and fixing the first and second U-shaped lamps, the optical sheets, and the reflective sheet; and
wherein a width of the non-luminous portion is 5 mm.

3. A method of making a direct type backlight unit, the method comprising:
- forming a plurality of U-shaped lamps having curved portions that are non-luminous portions;
- arranging the plurality of U-shaped lamps in two columns so that the curved portions of two opposite U-shaped lamps are symmetrically positioned in a center of a display area, so as to provide a uniform luminance across the plurality of U-shaped lamps;
- providing optical sheets above the plurality of U-shaped lamps, the optical sheets including a light-diffusion sheet, a prism sheet and a protection sheet;
- providing a reflective sheet below the plurality of U-shaped lamps; and
- providing a case to receive and fix the plurality of U-shaped lamps, the optical sheets, and the reflective sheet.
- wherein a fluorescent substance is not coated on the non-luminous portions in the curved portions of the plurality of U-shaped lamps,
- wherein a spacing interval between the curved portions of the opposite U-shaped lamps is smaller than a width of the non-luminous portion;
- wherein a width of the non-luminous portion is 5 mm,
- wherein the curved portions of the opposite U-shaped lamps are symmetrically maintained at a spacing interval of 1 mm, and
- wherein a diameter of each of the U-shaped lamps is 3 to 4 mm.

4. The direct type backlight unit of claim 1, wherein the curved portion of each lamp is not coated with the fluorescent substance.

5. The backlight unit of claim 2 wherein the curved section of each lamp is not coated with the fluorescent substance.

6. The method of claim 3, wherein the curved portion of each lamp is not coated with the fluorescent substance.

* * * * *